Aug. 25, 1959 — A. D. WISEMAN — 2,900,833
VARIABLE PITCH V-PULLEY
Filed May 7, 1957

Alex D. Wiseman
INVENTOR.

United States Patent Office 2,900,833
Patented Aug. 25, 1959

2,900,833

VARIABLE PITCH V-PULLEY

Alex D. Wiseman, Poplar Bluff, Mo.

Application May 7, 1957, Serial No. 657,675

1 Claim. (Cl. 74—230.17)

The present invention relates to new and useful improvements in expansible V-pulleys and has for its primary object to provide, in a manner as hereinafter set forth, novel means for expeditiously varying the pitch of such pulleys and for firmly securing the adjustment.

Other objects of the invention are to provide an expansible pulley of the aforementioned character which will be comparatively simple in construction, strong, durable, compact, of light weight and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
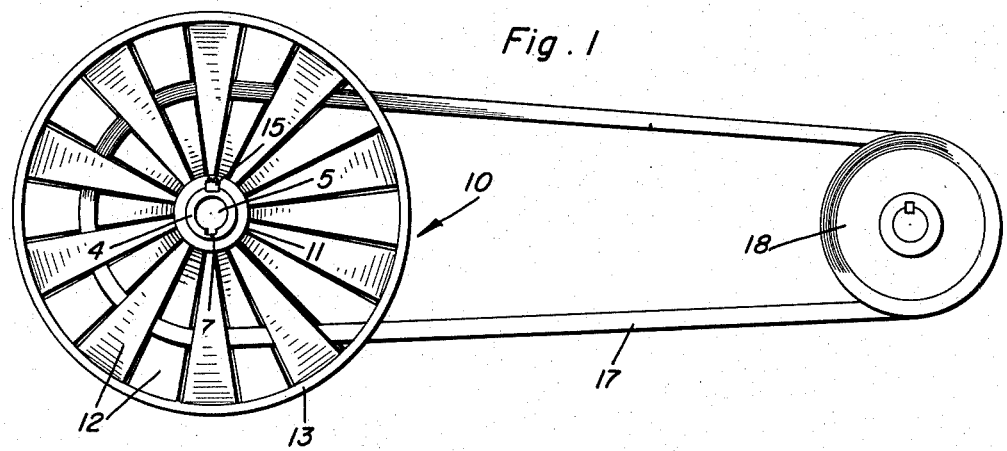
Figure 1 is a view in side elevation, showing a variable pitch V-pulley embodying the present invention in operation.
Figure 3:
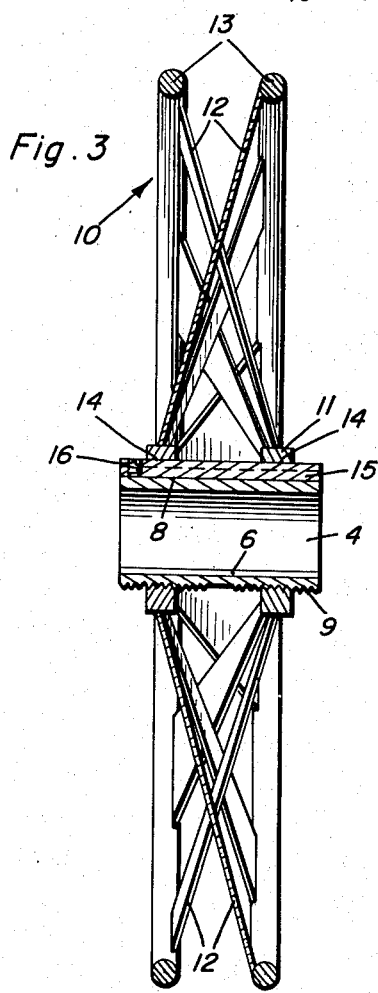
Figure 3 is a vertical sectional view, taken substantially on the line 3—3 of Figure 2.
Figure 2:
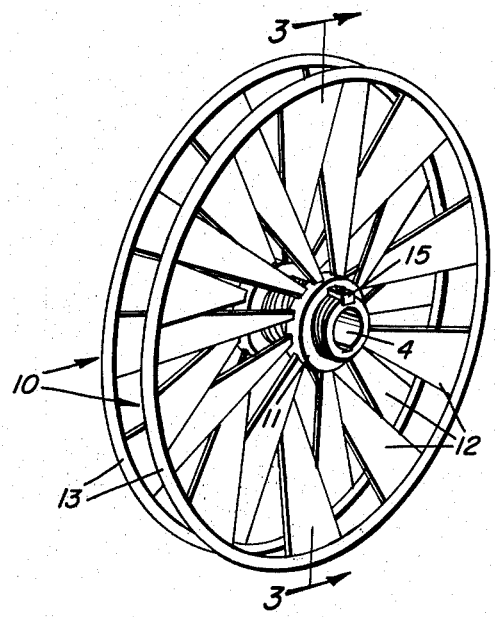
Figure 2 is a perspective view of the pulley.

Referring now to the drawing in detail, it will be seen that the embodiment of the invention which has been illustrated comprises a sleeve or bushing 4 of suitable metal which is fixed on a shaft 5. Toward this end, the bushing 4 is provided with an internal way 6 for the reception of a key or spline on the shaft 5, as indicated at 7. The bushing 4 further includes an external way 8 and externally oppositely threaded end portions 9.

Mounted for longitudinal adjustment toward or away from each other on the oppositely threaded end portions 9 of the bushing 4 is a pair of opposed, interlaced, substantially conical duplicate half sections which are designated generally by reference character 10. The half sections 10 include hubs 11 in the form of metallic rings which are threadedly mounted on the end portions of the bushing 4. The half sections 10 further include crossed, inwardly tapered spokes 12 having their inner ends fixed to the hubs 11. Outwardly offset rims 13 are fixed on the outer ends of the spokes 12.

The hubs 11 have formed therein aligned ways 14 which are in communication with the way 8 of the bushing 4. The ways 14 and 8 are for the reception of a removable key 15 which secures the hubs 11 in adjusted position on the bushing 4. A setscrew 16 secures the key 15 in position.

It is thought that the operation of the pulley will be readily apparent from a consideration of the foregoing. Briefly, to expand or contract the pulley, the setscrew 16 is removed or loosened and the key 15 is removed. While holding the bushing 4 stationary, the half sections 10 are then turned by hand in either direction for simultaneously adjusting the hubs 11 toward or away from each other on the oppositely threaded end portions 9 of said bushing. Thus, the pitch of the pulley is adjusted as desired. In Figure 1 of the drawing reference character 17 designates a conventional V-belt engaged with the pulley. The other end of the belt 17 is trained over a conventional pulley 18.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

A variable pitch V-pulley comprising a sleeve for mounting on a shaft, said sleeve having a longitudinal keyway therein and including oppositely threaded end portions and receiving thereon a pair of complemental pulley half sections each including a hub threadedly engaged on a respective end of the sleeve whereby common rotation of the hubs will move the same toward and away from each other, each of said hubs being of generally rectangular configuration in cross section and each of said hubs having a keyway therein communicating with the first-named keyway, a key in the keyways fixing the hubs relative to the sleeve, a setscrew in one end portion of the key engaged in the first-named keyway for releasably securing said key in position, each half section also including an annular rim and a plurality of circumferentially spaced, trapezoidal spokes interconnecting the hub and rim, the hub and rim of each half section being disposed in spaced, parallel planes and said spokes being straight whereby each half section is of frustoconical configuration, the wide ends of said spokes being connected with their respective rims and the narrow ends thereof being connected to said hubs and the spokes of one section being interdigitated with the spokes of the other section whereby the spokes, at their point of crossing, provide a belt-receiving V-notch of substantially constant angularity which is shiftable radially of said sleeve upon movement of said hubs toward and away from each other, the narrow ends of said spokes being connected to their respective hubs substantially centrally thereof.

References Cited in the file of this patent

UNITED STATES PATENTS

| | | |
|---|---|---|
| 1,913,226 | Adams | June 6, 1933 |
| 2,054,564 | Quiroz | Sept. 15, 1936 |
| 2,168,835 | Wells | Aug. 8, 1939 |
| 2,555,189 | Fuchslocher | May 29, 1951 |
| 2,633,031 | Browning | Mar. 31, 1953 |